(12) United States Patent
Miller

(10) Patent No.: US 8,830,523 B2
(45) Date of Patent: Sep. 9, 2014

(54) ARTICLE IMAGE ANNOTATION SYSTEM

(71) Applicant: Diane M. Miller, Fort Collins, CO (US)

(72) Inventor: Diane M. Miller, Fort Collins, CO (US)

(73) Assignee: Couragent, Inc., Fort Collins, CO (US)

(*) Notice: Subject to any disclaimer, the term of this patent is extended or adjusted under 35 U.S.C. 154(b) by 0 days.

(21) Appl. No.: 13/665,186

(22) Filed: Oct. 31, 2012

(65) Prior Publication Data

US 2014/0118801 A1    May 1, 2014

(51) Int. Cl.
*H04N 1/04* (2006.01)

(52) U.S. Cl.
USPC ............ 358/1.9; 358/452; 358/1.12; 358/537

(58) Field of Classification Search
USPC .................................. 358/1.9, 452, 1.12, 537
See application file for complete search history.

(56) References Cited

U.S. PATENT DOCUMENTS

| | | | | |
|---|---|---|---|---|
| 6,043,866 A | * | 3/2000 | Kawai et al. | 355/75 |
| 6,441,921 B1 | * | 8/2002 | Soscia | 358/1.9 |
| 6,909,526 B1 | * | 6/2005 | Dawe | 358/471 |

OTHER PUBLICATIONS

U.S. Appl. No. 12/925,802, filed Oct. 29, 2010.

* cited by examiner

*Primary Examiner* — Houshang Safaipour
(74) *Attorney, Agent, or Firm* — Craig R. Miles; CR Miles P.C.

(57) ABSTRACT

An article image annotation system including an imager and a transparent sheet discrete from the imager having a first face adapted to engage an imageable surface of an article and a second face adapted to receive annotations and adapted for engagement with the imager to allow imaging of the imageable surface of the article in association with the annotation through the transparent sheet, thereby producing an annotated article image.

7 Claims, 2 Drawing Sheets

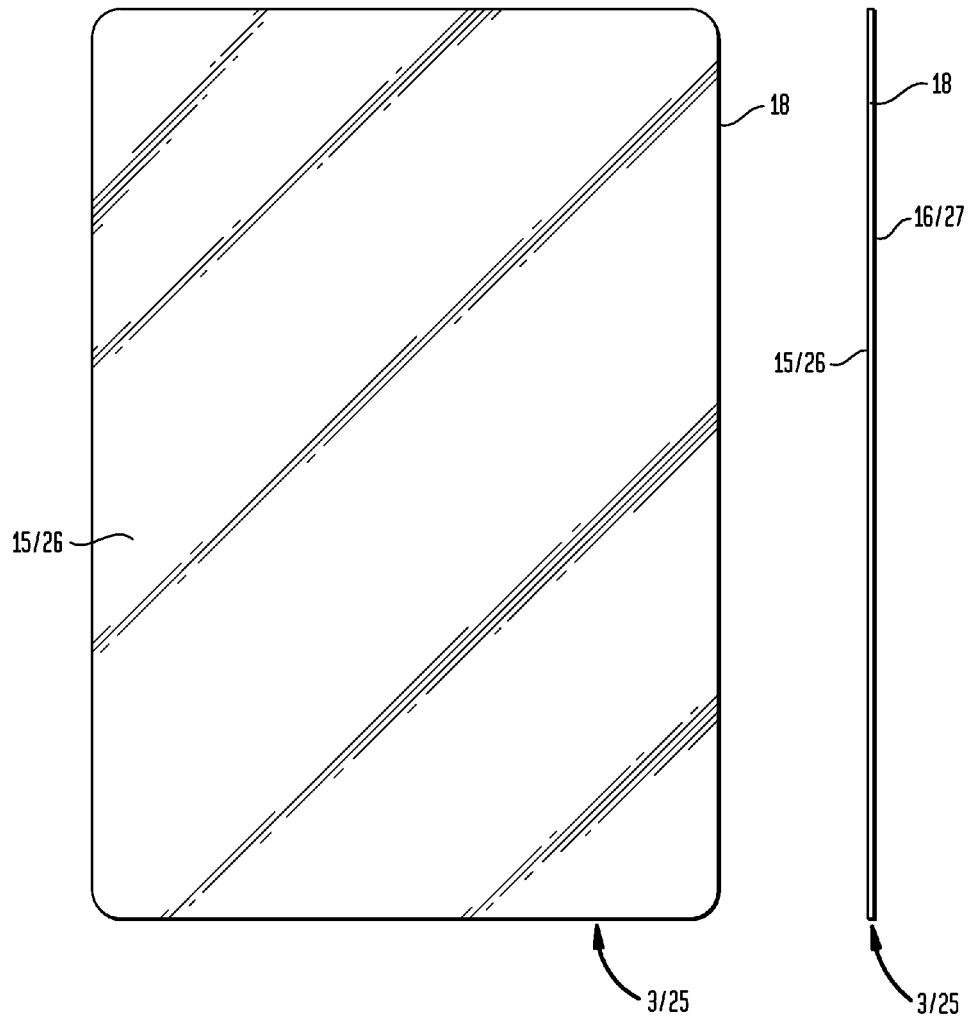

ARTICLE IMAGE ANNOTATION SYSTEM

I. FIELD OF THE INVENTION

An article image annotation system including an imager and a transparent sheet discrete from the imager having a first face adapted to engage an imageable surface of an article and a second face adapted to receive annotations and adapted for engagement with the imager to allow imaging of the imageable surface of the article in association with the annotation through the transparent sheet, thereby producing an annotated article image.

II. BACKGROUND OF THE INVENTION

With the advent of digital imaging and digital storage of images there now exists a huge demand to generate digital images of prior produced tangible articles which have no digital counterpart. As one illustrative example, conventional photographs which have no digital counterpart are routinely scanned to generate an article image which may be stored in a memory and retrieved from memory for viewing. However, conventional scanners may not allow for annotation discrete from the imageable surface of the photograph, or allow for a desired level of annotation for association with the photograph, or subsequent retrieval of the annotation along with the digital image.

Accordingly, in the illustrative example of the photograph, the annotation may have to be included on or in the image face of the photograph in which case the annotation may be permanent and may be objectionable to the owner or others subsequently viewing or scanning the photograph, or the annotation may be included on or in the back face of the photograph in which case both the image face and the back face of the photograph require scanning to store the annotation in memory, and then the annotation may not be associated with the image face on retrieval of the digital image.

Additionally, many articles have a construction on or in which an annotation may not be practical or possible. As an additional illustrative example, a quilt of woven and stitched textiles may not allow annotation on the surface, or annotation of the surface may be objectionable, or may devalue the quilt.

It would be advantageous if annotations could be associated with the imageable surfaces of articles and in the stored article images without having to actually annotate on or in an imageable surface of the article.

III. SUMMARY OF THE INVENTION

Accordingly, a broad object of particular embodiments of the invention can be to provide an article image annotation sheet which can be engaged with an imageable surface of an article and on which an annotation can be made allowing the annotation to be associated with the imageable surface upon imaging through the transparent sheet, thereby producing an annotated article image.

Another broad object of the invention can be to provide an article image annotation system including at least a scanner having an upper transparent window and a lower transparent window and a article image annotation sheet having a first face adapted to be engaged with an upwardly facing imageable surface of an article and a second surface adapted to receive an annotation and for engagement with the upper transparent window of the scanner with the imageable surface in association with the annotation viewable through the upper and lower transparent windows for scanning.

Naturally, further objects of the invention are disclosed throughout other areas of the specification, drawings, photographs, and claims.

IV. BRIEF DESCRIPTION OF THE DRAWINGS

FIG. 2 is a front view of a particular embodiment of an article image annotation sheet useful in the method illustrated in FIG. 1.

FIG. 3 is a top view of a particular embodiment of an article image annotation sheet useful in the method illustrated in FIG. 1.

FIG. 4 is a side view of a particular embodiment of an article image annotation sheet useful in the method illustrated in FIG. 1.

V. DETAILED DESCRIPTION OF THE INVENTION

Figure 1:
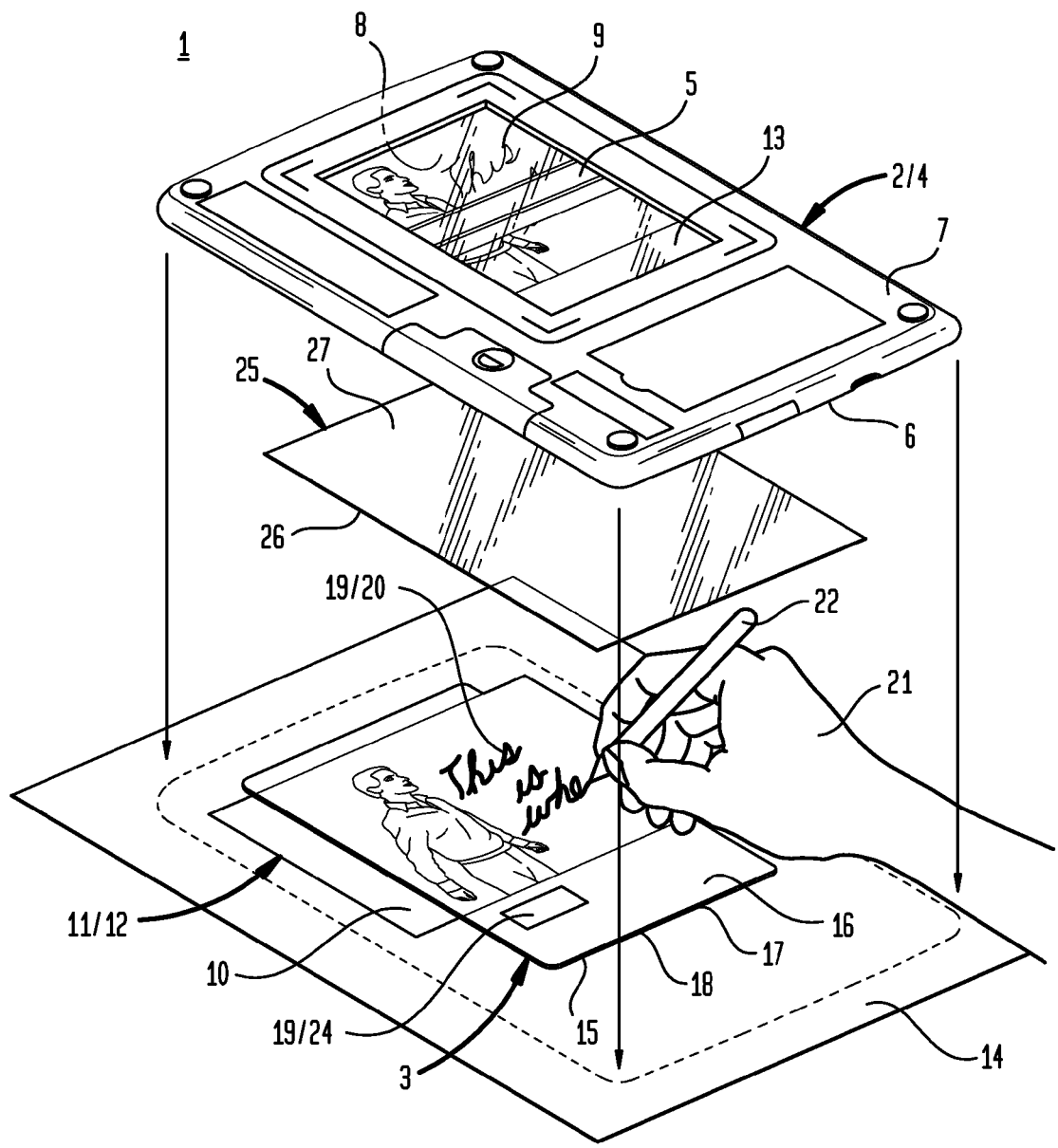
FIG. 1 is an illustration which shows a particular embodiment of an article image annotations sheet and a particular embodiment of the inventive article image annotation system and method of using the article image annotation sheet in the article image annotation system.

Now referring primarily to FIG. 1 which illustrates a particular embodiment of an article image annotation system (1) which at least includes an imager (2) and an article image annotation sheet (3) (also referred to as a "transparent sheet") (3) discrete from the imager (2). The imager (2) shown in the example of FIG. 1, can take the form of a portable image scanner (4) having a scanning element (5) contained within an enclosed space defined by mated engagement of an upper housing (6) and a lower housing (7) which correspondingly provides in aligned relation an upper transparent window (8) and a lower transparent window (9) which allows positioning of the upper transparent window (8) upon an imageable surface (10) of an article (11) while viewing the imageable surface (10) through the aligned lower transparent window (9) and upper transparent window (8). A particular embodiment of the portable image scanner (4) useful in the article image annotation system (1) is described in U.S. patent application Ser. No. 12/928,802, hereby incorporated by reference in the entirety herein. Other examples, of an imager (2) useful in embodiments of the article annotation system (1) take the form of flat bed scanners, cameras, hand-held scanners moved by hand over the imageable surface (10) of the article (11), or the like.

Again referring primarily to FIG. 1, while the article (11) shown in FIG. 1 is a photograph (12), the term "article" is not so limited, and broadly encompasses any object having an imageable surface (10) which can be converted to an article image (13) (including a digital article image) and as illustrative examples broadly encompasses: documents each of which may include one or more of images, printed text, handwriting, or the like; textiles or other materials including extruded, sheet, or woven materials, cloth, clothing, quilts, or the like; biological specimens such as pressed plant material, mounted insects, or the like; artwork including one or more of paintings, engravings, etchings, or the like; jewelry; postal stamps, sports cards, coins, medals, memorabilia, collectibles, or combinations thereof, whether discrete from or mounted to a substrate material (14).

Now referring to FIGS. 1 through 4, the article image annotation sheet (3) can take the form of a transparent sheet (3) having a first face (15) and a second face (16) disposed in opposed relation a thickness (17) apart having a periphery (18) which defines the configuration of the faces (15) (16) of the transparent sheet (3). As shown in the example of FIGS. 1 through 4, the transparent sheet (3) can have substantially flat first and second faces (15) (16) which terminate at the periphery (18) defining rectangular faces (15) (16); however, embodiments can include a periphery (18) which defines any configuration of the first and second faces (15) (16) useful in performing the method of the invention, as further described below. As to particular embodiments, the periphery (18) can define a configuration of the first and second faces (15) (16) which having dimensions substantially the same as the upper transparent window (8) of the portable image scanner (4), above described. As to particular embodiments, the transparent sheet (3) can provide a sufficient amount of flexure of the first and second faces (15) (16) to allow engagement of the transparent sheet (3) with an imageable surface (10) of an article (11) which may not be entirely flat but rather includes in the entirety or as to a portion of the imageable surface (11) three dimensional features whether depressed or raised but imageable by the imager (2) utilized. The transparent sheet (3) can be sufficiently transparent for the imager (2) to obtain an article image (13) of the imageable surface (10) of the article (11) through the transparent sheet (3).

Again referring primarily to FIG. 1, embodiments of the article image annotation system (1) can further include annotations (19) (also referred to as "viewable indicia") which can be removably established on the second face (16) of the transparent sheet (3). The second face (16) can be adapted to receive and allow removal of a wide variety of annotations (19). As shown in the example of FIG. 1, the second face (16) of the transparent sheet (3) can be adapted to receive and allow removal of annotations (19) in the form of marks (20) applied by an annotator (21) (shown as the hand of a person) using an annotation element (22). As to these embodiments, the transparent sheet (3) can be fabricated in the entirety, or to provide a layer, of a vinyl plastic sheet, an acrylic plastic sheet, or similar plastic sheet, or combinations thereof, which provide a second face (16) adapted to receive marks (20) from the annotation element (22) in the form of an ink (23) which dry erases or damp erases from the second face (16) of the transparent sheet (3). The annotation element (22) can take form of a writing or drawing device such as a pen, stylus, or the like capable of delivering ink (23) to the second face (16) of the transparent sheet (3). However, it is not intended that term annotations (19) be limited solely to marks (20), but rather broadly encompasses any material that can be applied and removed from the second face (16) including, but not limited to, embodiments in the form of peelable materials (24) such as peelable decals, peelable stickers, peelable appliques, or the like, or combinations thereof which can be applied discrete from or used with marks (20) and other embodiments of annotations (19).

Again referring primarily to FIG. 1, particular embodiments of the article image annotation system (1) can further include one or more additional transparent sheets (3). As one example, the system (1) can include a first transparent sheet (3) and a second transparent sheet (25) each discrete from the imager (3). Each of the first and second transparent sheets (3) (25) can be in the form(s), as above described. The first face (15) of the first transparent sheet (3) can be adapted to engage imageable surface (10) an article (11) and the second face (16) adapted to engage the first face (26) of the second transparent sheet (25). The second face (27) of said second transparent sheet (25) can be adapted to engage the imager (2) for imaging the imageable surface (10) of the article (11) through said first and second transparent sheets (3) (25). Understandably, the one or more transparent sheets (3) (25) can be obtained discrete from the system (1) and utilized with an imager (2), as further described below.

Again referring to FIG. 1, which shows embodiments of a method of annotating an article image (13) using the above described system (1) or using one or more transparent sheets (3) (25) with an imager (2) to annotate an article image (13) including the steps of engaging a first face (15) of a transparent sheet (3) to an imageable surface (10) of an article (11), each as above described. The article (11) may be discrete from or fixed to a substrate material (14). The substrate material (14) can be as an example a plurality sheets bound at one side in the form of a book, photograph album, stamp album, or the like. Annotating a second face (16) of the transparent sheet (3) with viewable indicia (19) which can be in the form of removable marks (20), peelable materials (24), or otherwise allows the viewable indicia (19) to be viewably associated with the imageable surface (10) of the article (11) engaged to the first face (15) of the transparent sheet (3). Then by engaging the imager (2) to the second face (16) of the transparent sheet (3) having the viewable indicia (19) and by imaging the imageable surface (10) of the article (11) through the transparent sheet (3) with the imager (2), the article image (13) can be annotated.

As above described, the imager (2) can be scanner (4) having an upper transparent window (8) and a lower transparent window (9), the upper transparent window (8) viewable through the lower transparent window (9). This embodiment of the invention provides the advantage of having the imageable surface (10) of the article (11) remain upwardly facing allowing ready engagement of the first face (15) of the transparent sheet (3) with the imageable surface (10) and ready placement of the annotation (19) on the second face (16) of the transparent sheet (3) for production the annotated the article image (13).

The example of FIG. 1, illustrates a method of annotating the second face (16) of the transparent sheet (3) having the first face (15) engaged to an upwardly facing imageable surface (10) using an annotation element (22) to produce viewable marks (20). The imageable surface (10) engaged to the annotated transparent sheet (3) does not have to be relocated to engage the imager (2). Rather the imager (2) can be relocated to engage the annotated second face (16) of the transparent sheet (3) and in the embodiment of a scanner (4) having an upper transparent window (8) and a lower transparent window (9), the upper transparent widow (8) can be readily downwardly engaged with the annotated second face (16) of the transparent sheet (3) as viewed through the lower transparent window (9) and the imageable surface (10) scanned to obtain an annotated article image (13).

The method can further include the step of engaging the first face (26) of a second transparent sheet (25) and engaging the imager (2) to a second face (27) of the second transparent sheet (25). Thereby allowing the second face (16) (27) of each of the first and second transparent sheets (3) (25) to be annotated with viewable indicia (19), as above described.

The method can further include the steps of disengaging the imager (2) or scanner (4) from the second face (16) of the transparent sheet (3) and disengaging the first face (15) of the transparent sheet (3) from the imageable surface (10) of the article (11) and removing the annotation (19) from the second face (16) of the transparent sheet (3).

As can be easily understood from the foregoing, the basic concepts of the present invention may be embodied in a variety of ways. The invention involves numerous and varied embodiments of an article image annotation system (1) or article annotation sheet (3) and methods for making and using such article image annotation system (1) and such article annotation sheet (3) including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "scanner" should be understood to encompass disclosure of the act of "scanning"—whether explicitly discussed or not—and, conversely, were there effectively disclosure of the act of "scanning", such a disclosure should be understood to encompass disclosure of a "scanner" and even a "means for door scanning." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) the article annotation system and article image annotation sheets herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A method of annotating an article image, comprising:
engaging a first face of a flexible transparent sheet to an imageable surface of a first article;
marking said second face of said flexible transparent sheet with an annotation;
engaging a second article to said second face of said transparent sheet;

engaging an scanner to said second face having said annotation, said scanner including an upper transparent window and a lower transparent window, said upper transparent window viewable through the lower transparent window, said upper transparent window engaged with second face of said transparent sheet; and scanning said article through said flexible transparent sheet having said annotation with said scanner, thereby annotating said article image.

2. The method of claim 1, further comprising engaging a first face of said second transparent sheet to said second face of said first transparent sheet and engaging said imager to a second face of said second transparent sheet.

3. The method of claim 2, further comprising annotating said second face of said second transparent sheet.

4. An article image annotation system, comprising:
a scanner including a lower transparent window and upper transparent window viewable through said lower transparent window;
a transparent sheet discrete from said imager, said transparent sheet having a first face and a second face disposed in opposed relation a thickness apart, said first and second face terminating at a periphery, said first face adapted to engage an imageable surface of an article and a second face adapted to engage said upper transparent window for imaging said article through said transparent sheet; and
an annotation element operable to establish an annotation on said second face of said transparent sheet, wherein said annotation comprises marks, said second face of said transparent sheet further adapted for removal of said marks.

5. The system of claim 4, wherein said transparent sheet comprises a first transparent sheet and a second transparent sheet discrete from said imager, each having said first face and said second face disposed in opposed relation a thickness apart and which terminate at said periphery which defines at least three edges, said first face of said first transparent sheet adapted to engage an article and said second face adapted to engage said first face of said second sheet, said second face of said second transparent sheet adapted to engage said imager for imaging said imageable surface of said article through said first and second transparent sheets.

6. An article image annotation sheet, comprising:
a transparent sheet having a first face and a second face disposed in opposed relation a thickness apart and which terminate in a periphery, said first face adapted to engage an imageable surface of an article and a second face adapted to engage a scanner for imaging said article through said transparent sheet, wherein said imager comprises a scanner having an upper transparent window aligned with a lower transparent window, and wherein said periphery of said first and second faces of said transparent sheet have a configuration which allows said second face to engage substantially the entirety of said upper window for scanning said imageable surface of said article through said transparent sheet, wherein said second face of said transparent sheet further adapted to receive annotations in the form of viewable indicia.

7. The article image annotation sheet of claim 6, wherein viewable indicia comprise marks, said second face further adapted for removal of said marks.

\* \* \* \* \*